United States Patent

Kanno et al.

[11] Patent Number: 6,105,933
[45] Date of Patent: Aug. 22, 2000

[54] DIAPHRAGM VALVE STRUCTURE

[75] Inventors: Yohichi Kanno; Osamu Uchisawa; Jun Yamashima, all of Miyagi-ken, Japan

[73] Assignee: Kabushiki-Kaisha Motoyama Seisakusho, Miyagi-ken, Japan

[21] Appl. No.: 08/492,788

[22] Filed: Jun. 20, 1995

[30] Foreign Application Priority Data

Jun. 29, 1994 [JP] Japan .................................. 6-147575

[51] Int. Cl.⁷ ........................................................ F16K 7/17
[52] U.S. Cl. ............................................ 251/331; 251/117
[58] Field of Search .................................. 251/331, 359, 251/117; 137/513.3, 513.5, 513.7

[56] References Cited

U.S. PATENT DOCUMENTS

| | | | |
|---|---|---|---|
| 1,670,318 | 5/1928 | Shaff ..................................... | 137/513.7 |
| 1,695,848 | 12/1928 | Higgins ............................... | 251/117 X |
| 1,883,240 | 10/1932 | Phelan ................................. | 251/117 |
| 4,545,565 | 10/1985 | Sano et al. ........................... | 251/331 |
| 4,828,219 | 5/1989 | Ohmi et al. ......................... | 251/331 X |
| 5,092,561 | 3/1992 | Moriuchi et al. ................... | 251/117 |
| 5,186,434 | 2/1993 | Nishimura et al. ................. | 251/331 |

FOREIGN PATENT DOCUMENTS

| | | | |
|---|---|---|---|
| 645812 | 10/1935 | Germany ............................. | 251/117 |
| 6-11055 | 1/1994 | Japan . | |

*Primary Examiner*—Kevin Lee
*Attorney, Agent, or Firm*—Marshall, O'Toole, Gerstein, Murray & Borun

[57] ABSTRACT

A diaphragm valve comprises a body with an inflow passage and an outflow passage for fluid, a valve seat disposed around said inflow passage, and a diaphragm which are disposed on said valve seat and opens and closes between said inflow passage and said outflow passage, and a gas flow hole which connects said inflow passage to said outflow passage is disposed in said valve seat.

1 Claim, 11 Drawing Sheets

DIAPHRAGM VALVE STRUCTURE

BACKGROUND OF THE INVENTION

1. Field of the Invention

The present invention relates to a diaphragm valve structure, and more specifically relates to a diaphragm valve structure which is applied to a bleed valve, a block valve or the like, which is used when a purging gas (an inactive gas, such as nitrogen gas, argon gas or the like) is continued to flow in, for example, a gas pipeline of ultrahigh purity gas for a semiconductor- or liquid crystal production line.

2. Description of the Prior Art

Figure 9:
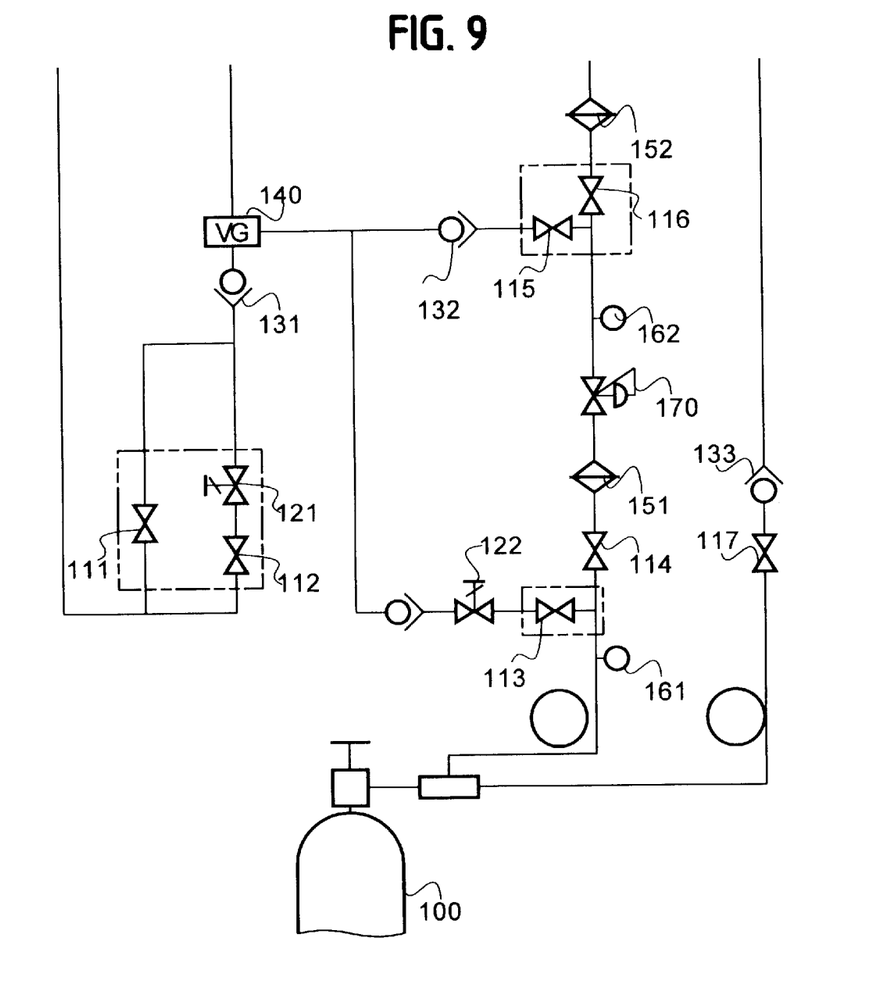
FIG. 9 is a view explaining one Embodiment of a gas pipeline of a semiconductor- or a liquid crystal manufacturing line.

FIG. 9 shows one embodiment of an ultrahigh purity gas pipeline in a semiconductor- or liquid crystal production line. In exchange of a gas bomb 100 for example, in this gas pipeline, when the gas bomb 100 is removed in a state where a corrosive gas remained, the corrosive gas reacts with moisture in the air, resulting in cause to corrode the line or components or the like. In order to prevent such corrosion, when the gas bomb 100 is removed, purge of the pipeline is carried out with a purging gas. In the embodiment shown in FIG. 9, nitrogen gases 183 and 184 are used as the purging gas. In this case, the nitrogen gas 183 is used as a vacuum generating (gas removing) gas for a vacuum generator 140 and is not used for filling gas into the line. And, the above-mentioned purge is carried out by filling the line with a nitrogen gas 184 and vacuumizing from a line with the vacuum generation using the nitrogen gas 183, repeatedly. In FIG. 9, the reference numerals 111 to 117 denote stop valves, 121 and 122 needle valves, 131 to 133 check valves, 151 and 152 filters, 161 and 162 pressure gauges, and 170 pressure controller.

In a case of the pipeline shown in FIG. 9, a vacuum generator 140 is used as a vacuum generating source at the vacuum purge. This vacuum generator 140 Autilize a property (an ejector effect), that the flow velocity of fluid (a nitogen gas) is increased within a nozzle, and negative pressure is generated near the position of nozzle to suck the fluid. Even if the nitrogen gas is not caused to flow, a corrosive gas does not flow backward from a vent line 181 to the pipeline by existence of check valves 131 and 132. Nevertheless, the corrosion gas reaches the position of the vacuum generator 140. Thus, corrosion is generated in the nozzle of the vacuum generator 140 or the like, resulting in that a trouble such as occurrence of nozzle clogging is likely occurs.

When vacuum purge is not carried out, or when a stop valve 111 is closed, a stop valve 112 is opened, and the flow rate is decreased while maintaining a needle valve 121 with a desired aperture, so that a constant flow rate of nitrogen gas 183 is caused to flow into the vacuum generator 140. Thus, a constant flow rate of nitrogen gas is caused to flow into the gas pipeline so that the inflow of gas from the vent line 181 is prevented.

Figure 10:
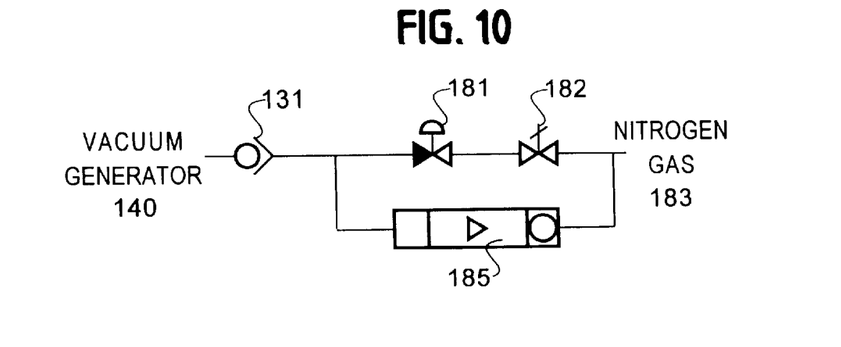
FIG. 10 is a view explaining the main portion of another Embodiment of the gas pipeline of a semiconductoror a liquid crystal manufacturing line.

As another Embodiment, there is adopted a structure as shown in FIG. 10, that an air-actuated valve 181 and a needle valve 182 are connected to each other in series and a mass flow controller 185 is disposed in parallel thereto, in place of the combination of the above-mentioned stop valves 111 and 112, with the needle valve 121. According to such a structure, a gas of a constant flow rate can be caused to flow through the mass flow controller, even in a state where the air-actuated valve is closed. Further, by using a flow rate control valve such as a needle valve or the like, in place of the mass flow controller, there can be also adopted a structure by which substantially the same effects as those mentioned-above can be obtained.

Additionally, there is known a structure by which substantially the same effects as those mentioned-above can be obtained, by forming a gas flow hole for a constant flow rate, which penetrates the primary side and secondary side of a gas pipeline valve, as described in Japanese Unexamined Patent Publication (kokai) No. 6-11055, for example.

However, according to the above-mentioned conventional structure using a plurality of valves, there are problems that a number of parts are required and the cost is high.

On the other hand, in a case where a gas flow hole for a constant flow rate is formed in a gas pipeline valve, it is difficult to manufacture the gas flow hole for a constant flow rate, resulting in the cause of high costs. Further, according to such a structure, the replaceability near the valve seat is bad, and there is a possibility that the air will remain or the like.

SUMMARY OF THE INVENTION

Accordingly, the object of the present invention is to provide a diaphragm valve structure in which gas inflow from such vent line as mentioned above can be prevented.

A diaphragm valve structure according to the present invention comprises a body with an inflow passage and an outflow passage for fluid, a valve seat disposed around said inflow passage and a diaphragm which are disposed on said valve seat and opens and closes between said inflow passage and said outflow passage, and a gas flow hole connecting said inflow passage to said outflow passage is disposed in said valve seat.

DETAILED DESCRIPTION OF THE PREFERRED EMBODIMENTS

Figure 1:
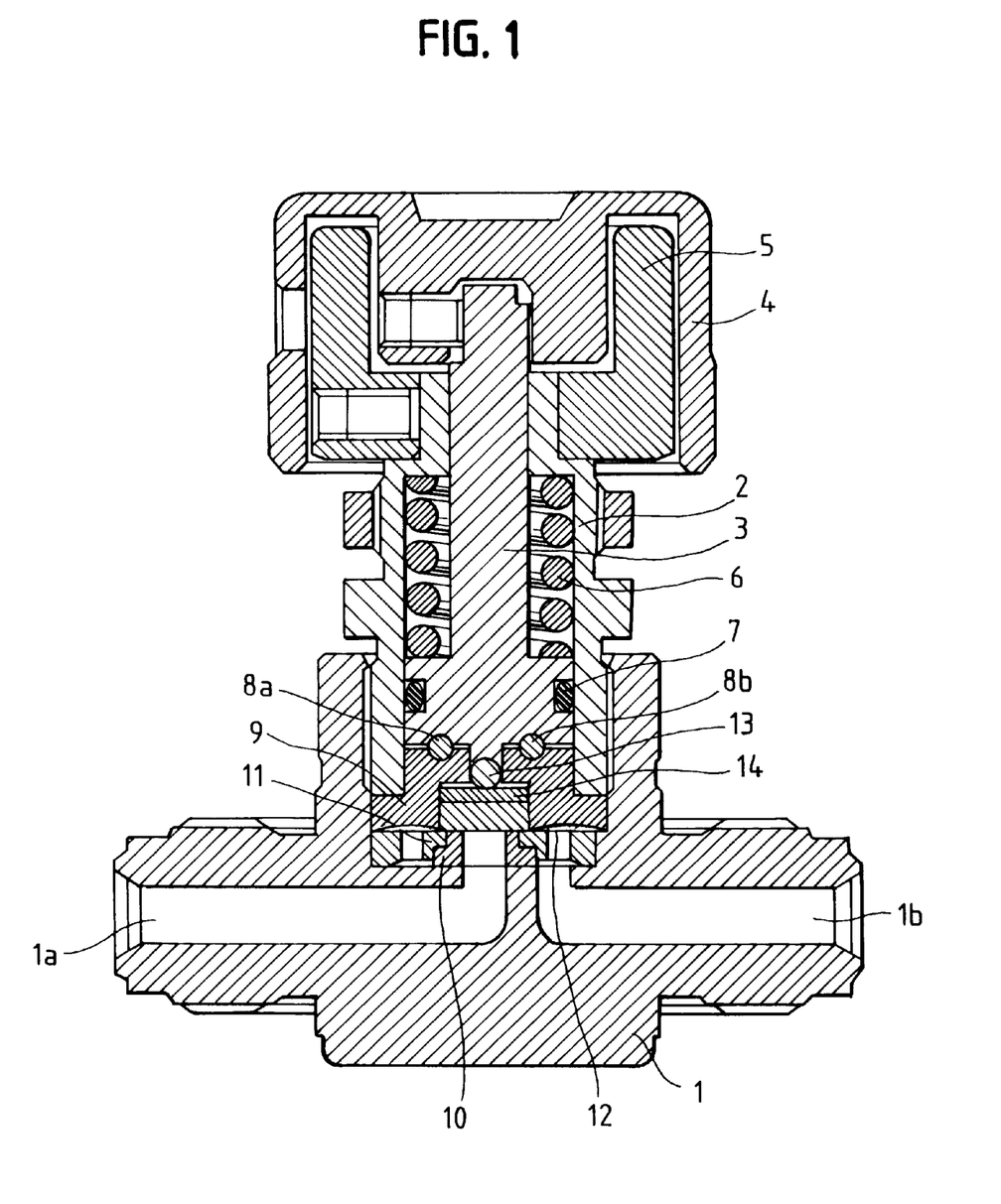
FIG. 1 is a cross-sectional view of an Embodiment in which the present invention is applied to a bleed valve.
Figure 11:
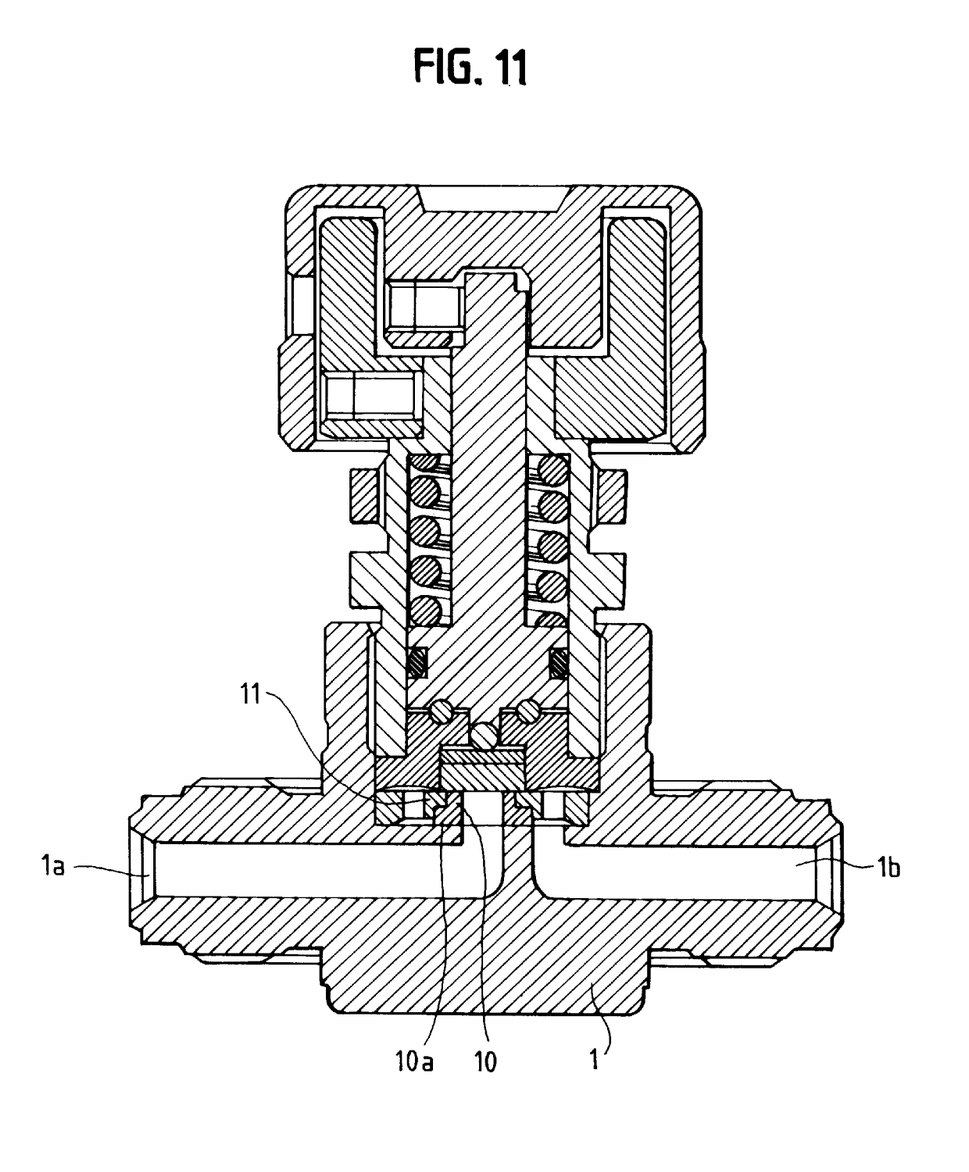
FIG. 11 is another cross-sectional view of the embodiment shown in FIG. 1.

FIGS. 1 and 11 show an Embodiment in which the present invention is applied to a bleed valve. The bleed valve shown in FIG. 1 is composed of a hand valve, and more specifically a manually operated metal diaphragm valve.

This bleed valve is composed of a body 1 with an inflow passage 1a and an outflow passage 1b for fluid, a hollow cylindrical guide member 2 fitted inside the body 1, a valve stem 3 provided at the center of the guide member 2, a handle 4 mounted on the upper portion of the valve stem 3, and a cylindrical base 5 fixed to the outer periphery of the upper portion of the guide member 2 etc.

A compression coil spring 6 which presses the valve stem 3 downward in FIG. 1 is provided inside the guide member 2. A sealing ring 7 for sealing the space between the valve stem 3 and the guide member 2 is mounted on the outer periphery of the valve stem 3. Further, a diaphragm presser 9 is disposed on the bottom of the guide member 2 through ball-shaped rolling elements 8a and 8b.

A cylindrical valve seat 10 is secured to the upper portions of the inflow passage 1a and outflow passage 1b at the center of the body 1, with a seat holder 11. A diaphragm 12 is disposed between the upper portion of the valve seat 10 and the diaphragm presser 9. Further, a relay ball 13 is contained in a through-hole formed at the center of the diaphragm presser 9. Below the relay ball 13 is located a press indenter 14. In such a structure, the body 1 and the seat holder 11 are made of stainless steel. The valve seat 10 is made of synthetic resin such as polychlorotrifluoroethylene (P C T F E), and the diaphragm is made of a cobalt-nickel alloy or the like.

In the above-mentioned structure, the diaphragm 12 is supported between the outer periphery lower surface of the diaphragm presser 9 and the valve seat 10, whereby the center portion of the diaphragm 12 comes into contact with the valve seat 10 or separates therefrom. As a result, the diaphragm 12 functions as a valve body which opens and closes passage between the inflow passage 1a and the outflow passage 1b. Opening and closing the diaphragm 12 as the valve body are executed by rotating a handle 4 clockwise or counterclockwise to shift the valve stem 3, so that the pressure on the diaphragm 12 by the press indenter 14 is controlled.

Figure 2:
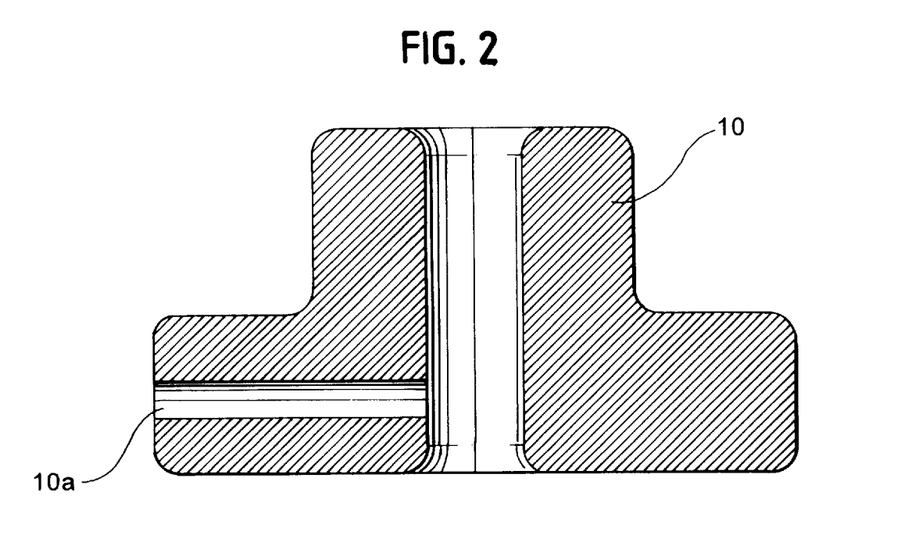
FIG. 2 is a cross-sectional view of a seat valve that is used in Embodiment of FIG. 1.
Figure 3:
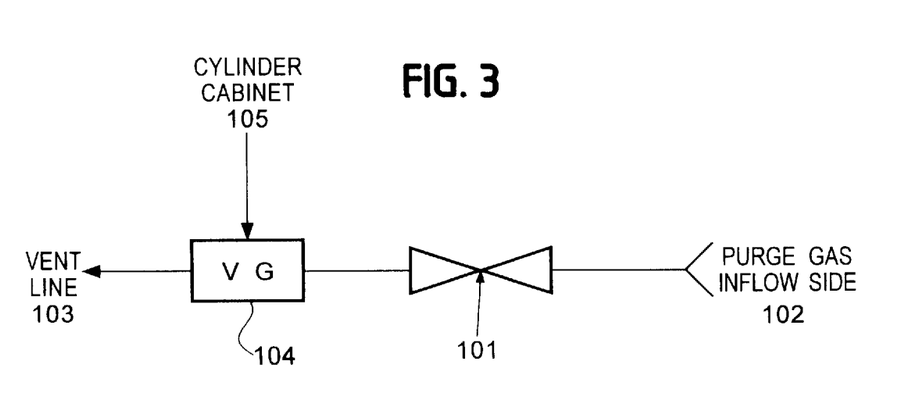
FIG. 3 is a view explaining a state in which the bleed valve of FIG. 1 is used in a gas pipeline.
Figure 13:
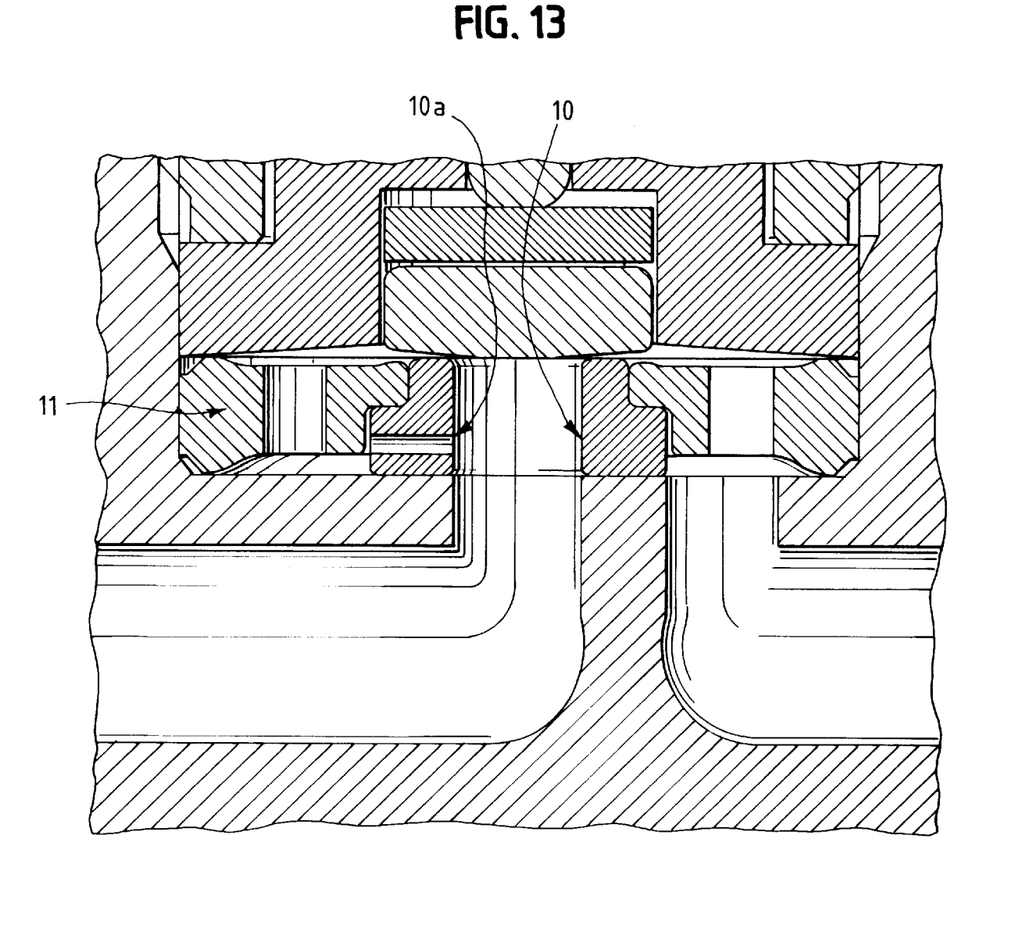
FIG. 13 is an enlarged cross-sectional view of the valve seat, the gas flow hole, and the seat holder of the embodiment shown in FIG. 1.

As shown in FIG. 2 and FIG. 13 a gas-flow hole 10a is formed on the outer periphery of the above-mentioned valve seat 10. Thus, even in a state where the diaphragm 12 shown in FIG. 1 is closed, the passage located between the inflow passage 1a and the outflow passage 1b of the body 1 is kept opened through the gas-flow hole 10a, whereby fluid flows from the inflow passage 1a to the outflow passage 1b. Further, in this case, the flow rate of the fluid can be controlled by changing the size of the gas-flow hole 10a. FIG. 3 shows a main portion using a bleed valve 101 with the above mentioned structure in a gas pipeline. The bleed valve 101 is installed between a purge gas inflow side 102 and a vacuum generator 104. To the vacuum generator 104 is connected a cylinder cabinet 105. In this pipeline, when the bleed valve 101 is closed, a constant flow rate of purge gas flows to the vacuum generator 104 side, through the gas-flow hole 10a, thereby preventing inflow of gas from a vent line 103. Further, when the bleed valve 101 is opened, large quantities of the purge gas flow. Accordingly, vacuum is generated in the vacuum generator 104, whereby the cylinder cabinet 105 is evacuated.

Figure 4:
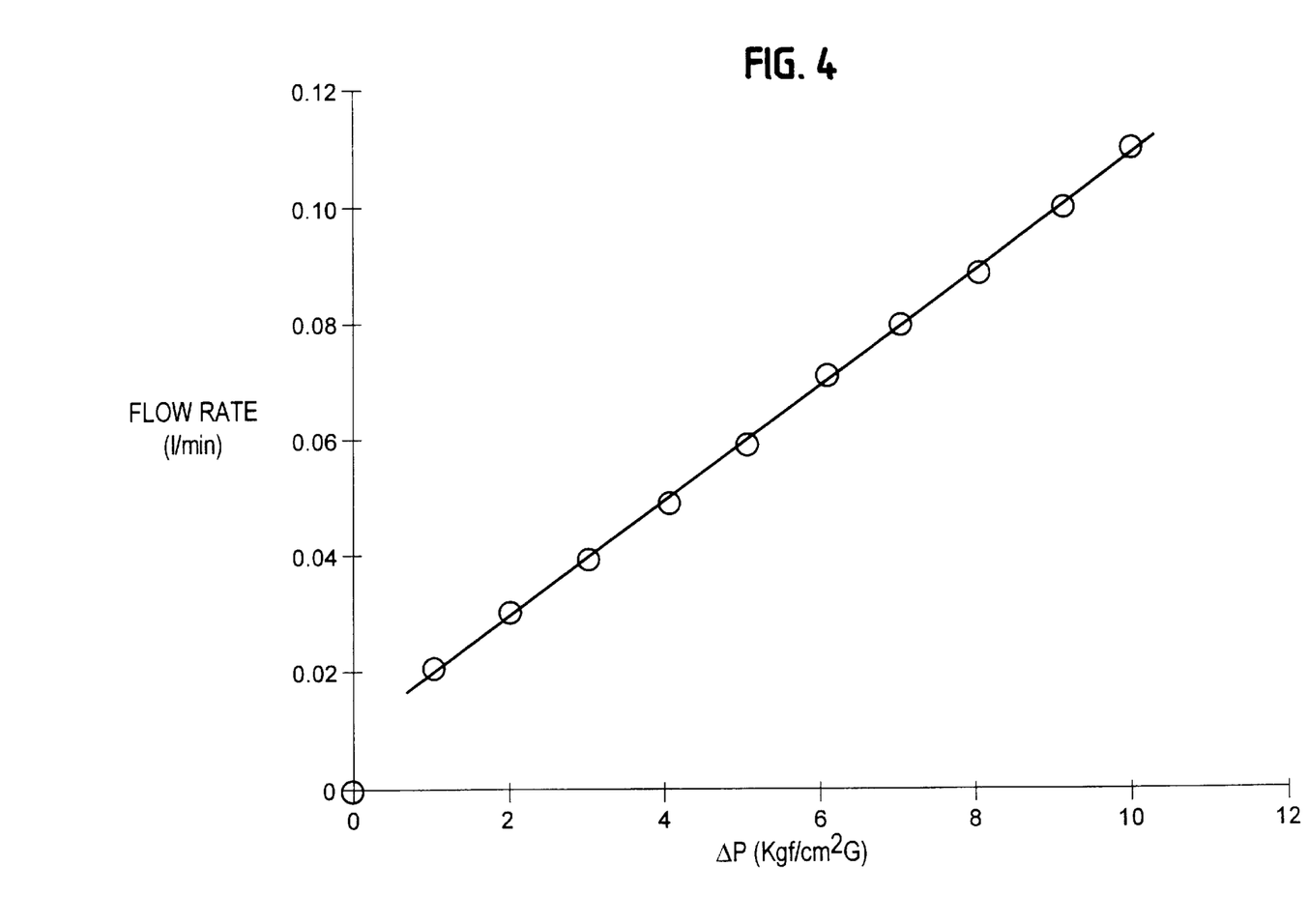
FIG. 4 is a graph of the flow rate of purge gas flowing into an outflow passage in the bleed valve of FIG. 1.

FIG. 4 is a graph showing purge gas pressure ΔP (Kgf/cm²G) in the inflow passage of the bleed valve body versus a flow rate (1/min) of the purge gas to the outflow passage of the bleed valve body, in a case where the diameter of gas-flow hole formed in a valve seat is 50 μm, in a bleed valve of the thus structured Embodiment as mentioned-above. As a purge gas, a nitrogen gas was used. The flow rate was measured with a soap film flowmeter.

Figure 5:
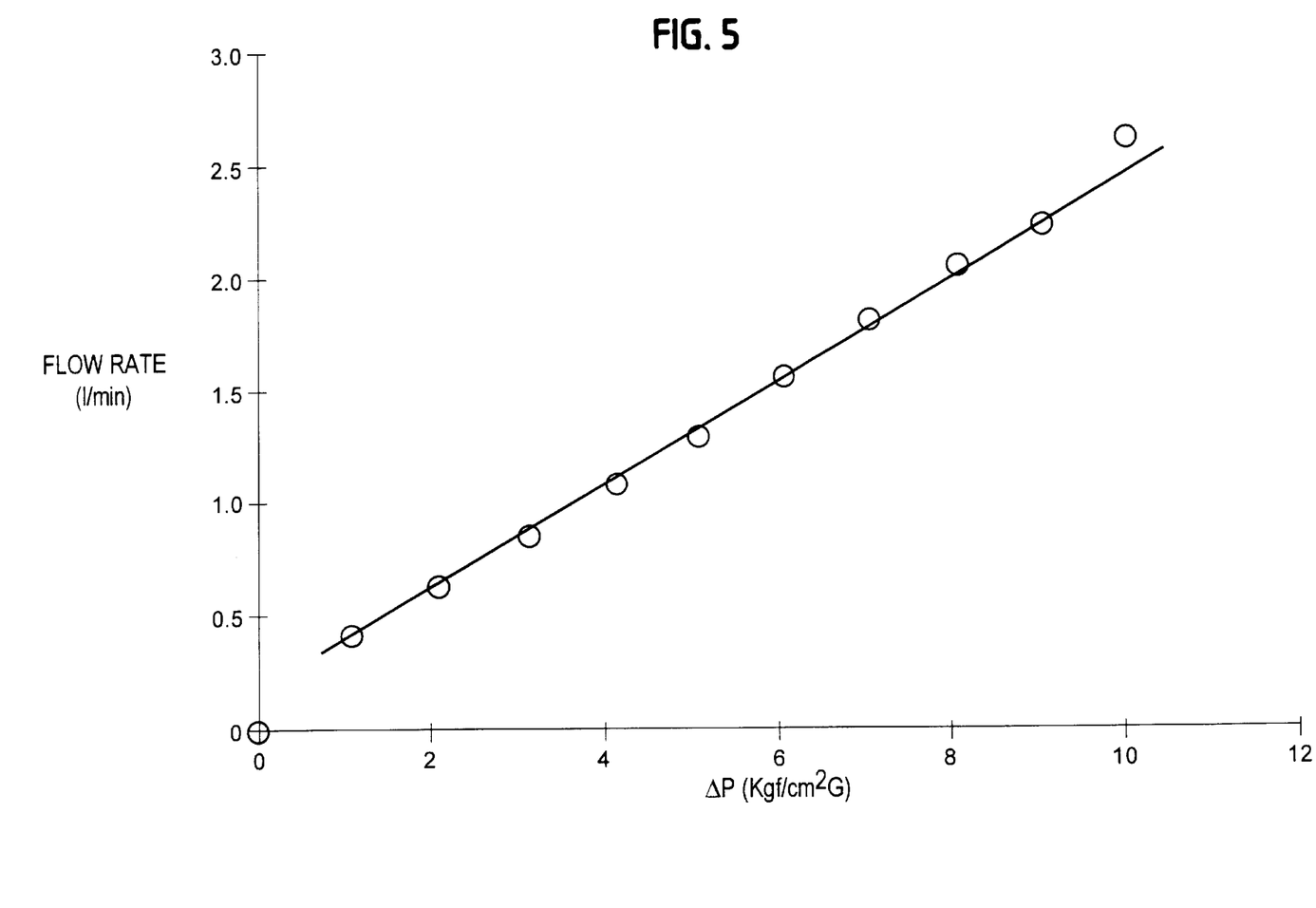
FIG. 5 is a graph of the flow rate of purge gas flowing into an outflow passage in the bleed valve of FIG. 1.
Figure 6:
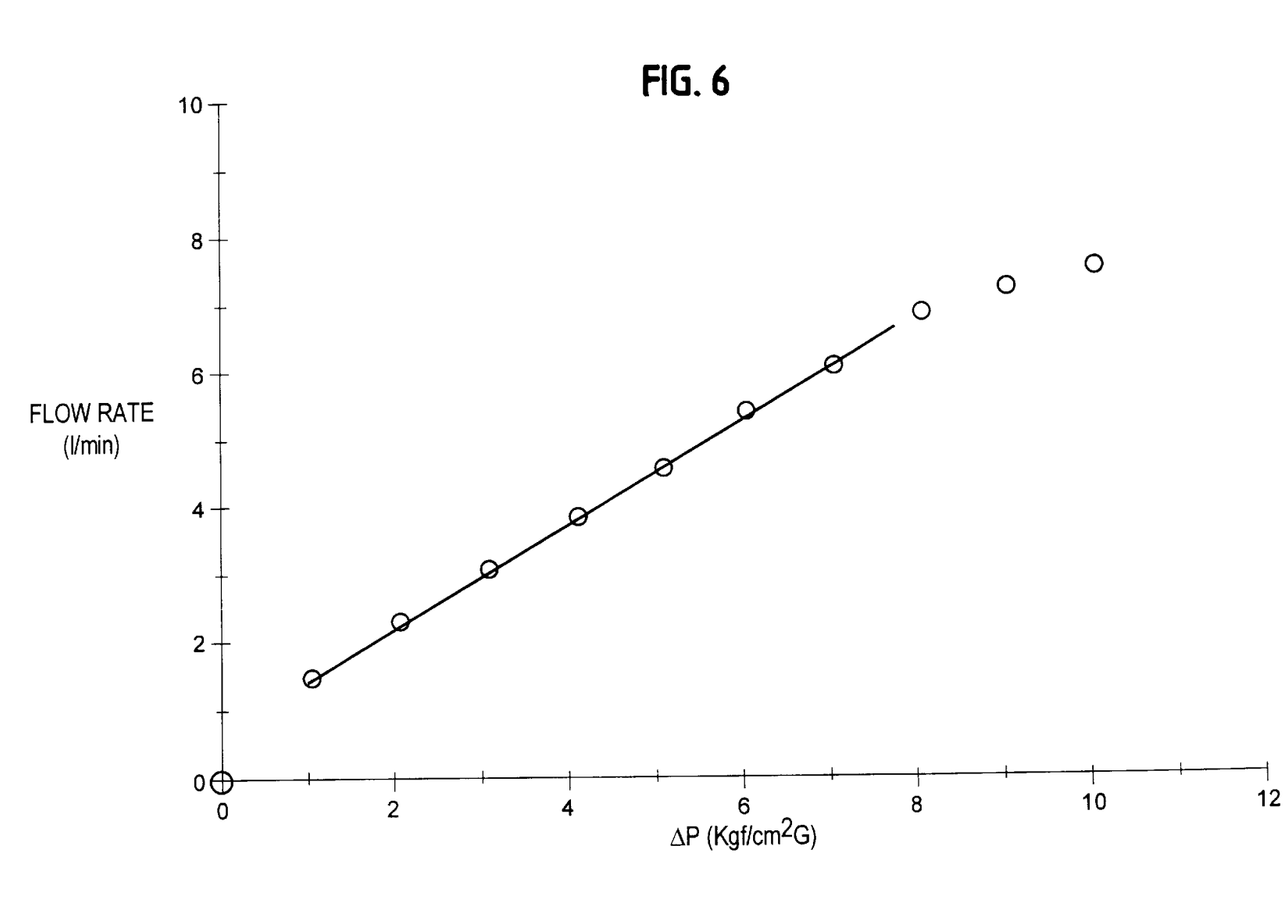
FIG. 6 is a graph of the flow rate of purge gas flowing into an outflow passage in the bleed valve of FIG. 1.

FIG. 5 is a graph showing also a flow rate (1/min) of the purge gas in a case where the diameter of gas-flow hole formed in a valve seat is 0.2 mm and also, FIG. 6 is in a case of the diameter is 0.4 mm.

Figure 7:
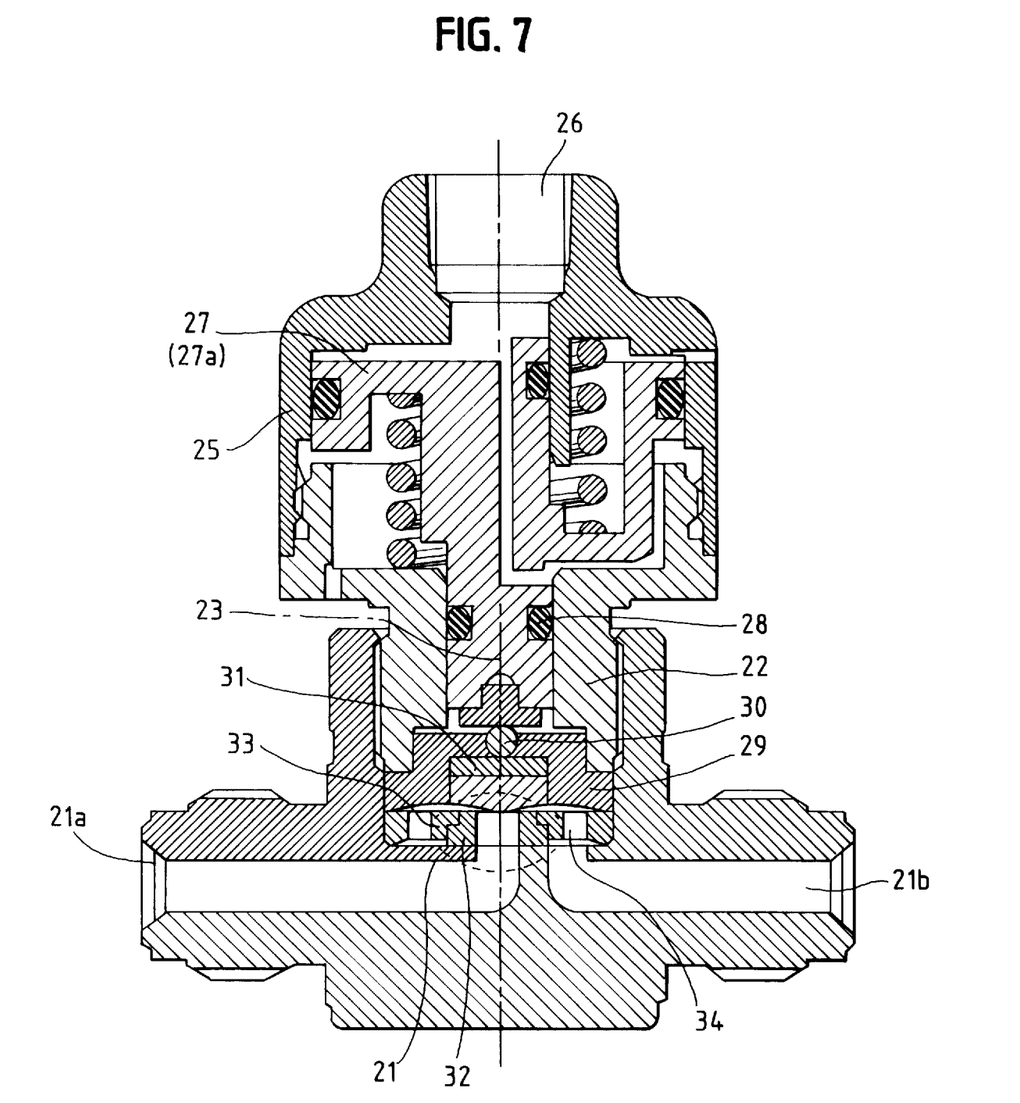
FIG. 7 is a cross-sectional view of another Embodiment in which the present invention is applied to a bleed valve.
Figure 12:
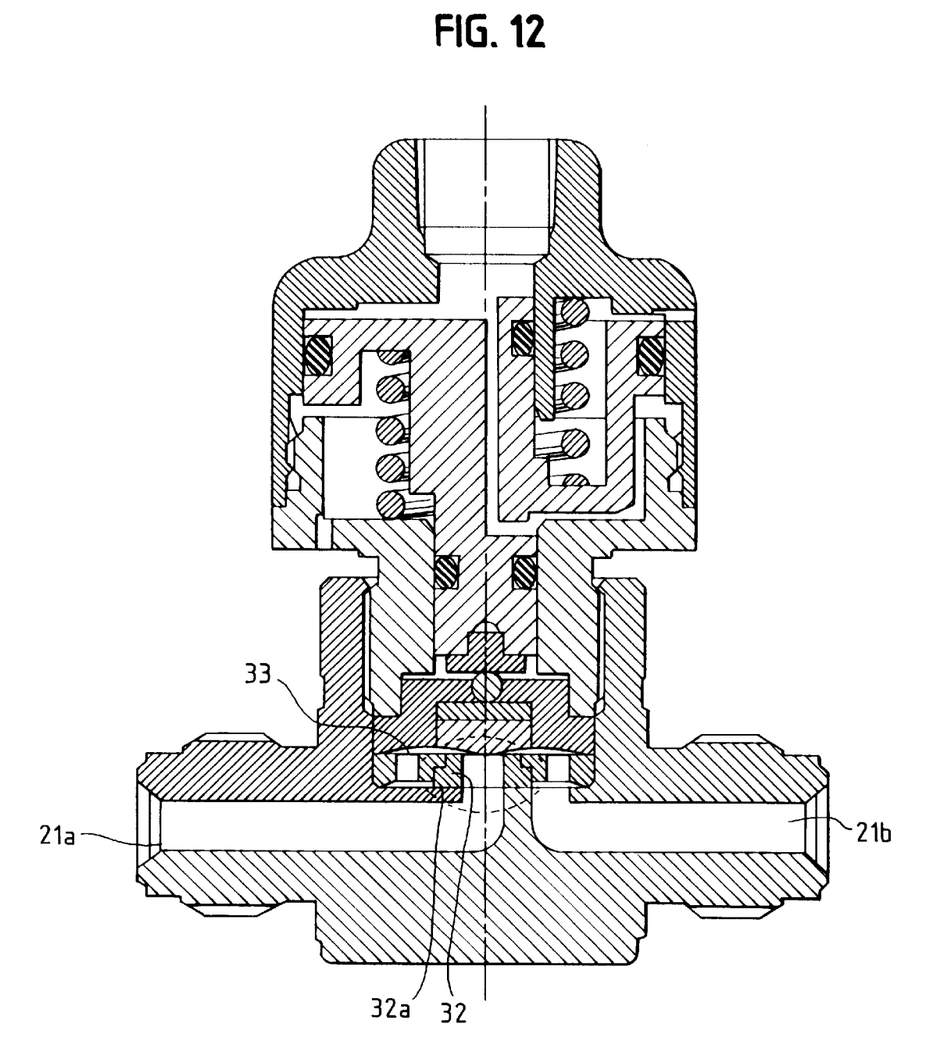
FIG. 12 is another cross-sectional view of the embodiment shown in FIG. 7.

FIG. 7 and 12 show another Embodiment in which the present invention is applied to a bleed valve. The bleed valve shown in FIG. 7 is an air-actuated valve, and more specifically, the bleed valve is composed of a direct seal type diaphragm valve.

This bleed valve is composed of a body 21 with an inflow passage 21a and an outflow passage 21b for fluid, a hollow cylindrical guide member 22 fitted inside the body 21, a valve stem 23 provided at the center portion of the guide member 22, an actuator cover 25, an air supply opening 26 and a drive section 27 monolithically formed on the valve stem seat 23 therewith, and so on. The drive section 27 is shown as structures in FIG. 7 that a drive section 27a on the left side has a normal opening (N 0) type structure and a drive section 27b on the right side has a normal closing (N 0) type structure.

Air sealing ring 28 is provided on the outer periphery of the valve stem 23 for sealing the space between the valve stem 23 and the guide member 22. A diaphragm presser 29 is disposed at the bottom portion of the guide member 22. A relay ball 30 is contained in a through hole formed at the center of the diaphragm presser 29. Further, a press indenter 31 is located below the relay ball 30.

A cylindrical valve seat 32 is secured to the upper portions of the inflow passage 21a and outflow passage 21b at the center of the body 21, with a seat holder 33. A diaphragm 34 is disposed between the upper portion of the valve seat 32 and the diaphragm presser 29. In the above-mentioned structure, body 21, valve seat 32, seat holder 33, diaphragm 34 and so on are made of substantially the same material as the above-described Embodiment.

In this Embodiment, the diaphragm 34 functions as a valve body which opens and closes a passage between the inflow passage 21a and the outflow passage 21b. Namely, the diaphragm 34 is supported between the outer periphery lower surface of the diaphragm presser 29 and the valve seat 32, whereby the center portion of the diaphragm 34 comes into contact with the valve seat 32 or separates therefrom.

Opening and closing of the above-described diaphragm 34 are executed by the supply of compressed air to an air supply port 26. Namely, in a case where the drive section 27 is an N O type drive section 27a on the left side, when compressed air is supplied as described above, the drive section 27 is pressed down, and at the same time, the valve stem 23 presses the diaphragm 34 onto the valve seat 32 through the press indenter 31. As a result, the diaphragm 34 tightly comes into contact with the valve seat 32, whereby the diaphragm 34 reaches a closed state. Further, when the supply of the compressed air is stopped, the drive section 27 is pressed up by the elasticity of an internal coil spring. As a result, a space is generated between the diaphragm 34 and the valve seat 32, whereby the diaphragm 34 reaches an open state.

In a case where the drive section 27 is an N C type drive section 27b on the right side in FIG. 7, when compressed air is not supplied, the drive section 27 is pressed down, and at the same time, the valve stem 23 presses the diaphragm 34 onto the valve seat 32 through the press indenter 31. As a result, the diaphragm 34 tightly comes into contact with the valve seat 32, whereby the diaphragm 34 reaches a closed state. Further, when the compressed air is supplied, the drive section 27 is pressed up. As a result, a space is generated between the diaphragm 34 and the valve seat 32, whereby the diaphragm 34 reaches an open state.

As shown in FIG. 12, substantially the same gas flow hole as in the above-described Embodiment is provided on the outer periphery of the valve seat 32. The gas flow hole 32a connects the inflow passage 21a of the body 21 to the outflow passage 21b. Thus, even in a case where the diaphragm 34 is closed, the passage between the inflow passage 21a of the body 21 to the outflow passage 21b is opened through the gas flow hole 32a, whereby fluid flows from the inflow passage 21a to the outflow passage 21b.

Figure 8:
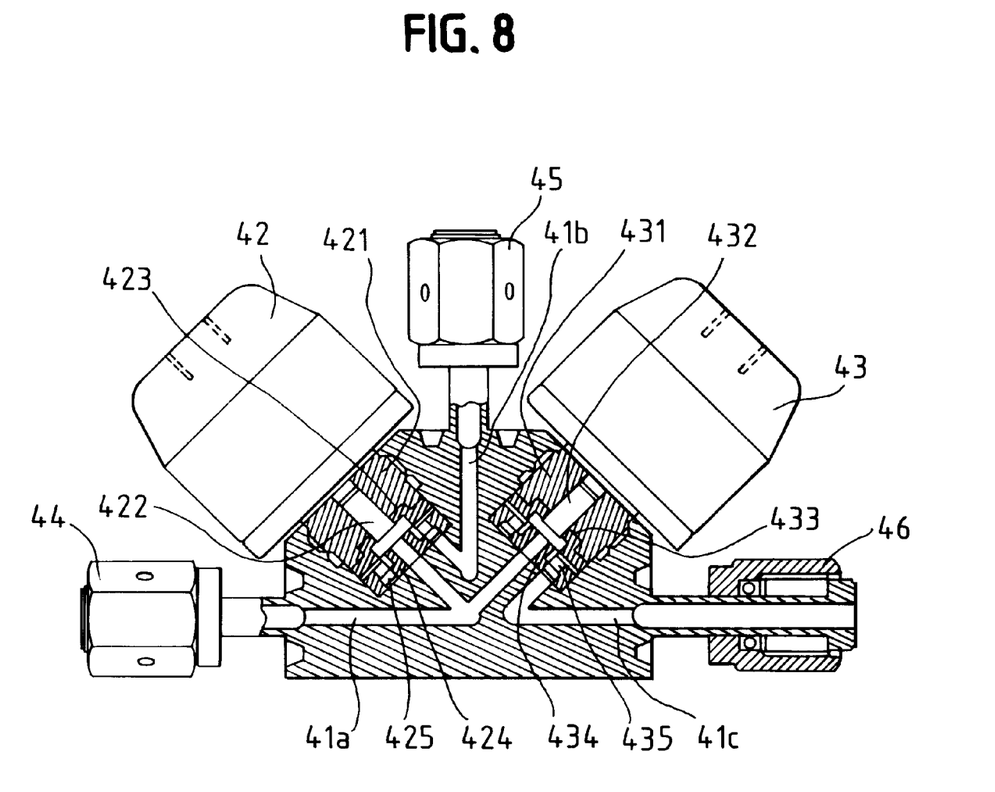
FIG. 8 is a cross-sectional view of an Embodiment in which the present invention is applied to a block valve.

FIG. 8 shows an Embodiment in which the present invention was applied to a block valve. In the block valve, a body 41 provides two drive sections 42 and 43 and three connecting sections 44, 45 and 46. The body 41 has an inflow passage 41a and an outflow passages 41b and 41c for fluid.

The drive sections 42 and 43 are respectively composed of cylindrical guide members 421 and 431 fitted inside the body 41, valve stems 422 and 432 provided at the center portion of the respective guide members 421 and 431, diaphragm pressers 423 and 433, valve seats 424 and 434, and diaphragms 425 and 435 supported between diaphragm pressers 423 and 433 and the valve seats 424 and 434, and so on. Substantially the same gas flow hole as in the above-described Embodiment is provided in the valve seat 32. The gas flow hole connects the inflow passage 41a of the body 41 to the outflow passages 41b and 41c.

According to the block valve, even in a case where the diaphragms 425 and 435 are closed, a gas is supplied from the connecting section 44 to the inflow passage 41a of the body 41 and the gas passes the outflow passages 41b and 41c to connect to the connecting sections 45 and 46 through the gas flow hole respectively. Therefore, the inflow of gas from the connecting sections 45 and 46 can be prevented.

As explained above, according to the present invention, a valve seat provides a gas flow hole which connects an inflow passage to an outflow passage. Consequently, even in a case where a valve is closed, a gas of a constant flow rate can be caused to flow. Thus, even in a case where a valve is closed, the inflow of gas from a vent line can be prevented by connecting the outflow passage to the vent line, and connecting the inflow passage to the purge gas respectively. And, in this case, the flow rate of gas to be flowed from the inflow passage to the outflow passage can be controlled only by changing the diameter of the gas flow hole of the valve seat. Thus, the operation can be easily executed at a low cost. Additionally, since a gas flow hole is provided in the valve seat, gas purge effect on the inside of the valve is high, thereby preventing corrosion of the valve due to a corrosive gas. Thus, the durability of the valve itself can be improved.

What is claimed is:

1. A diaphragm valve comprising:

a body with an inflow passage and an outflow passage for fluid, a valve seat disposed around said inflow passage, a diaphragm which is disposed on said valve seat and opens and closes between said inflow passage and said outflow passage, and a gas flow hole which connects said inflow passage to said outflow passage disposed in said valve seat, wherein said fluid continuously flows from said inflow passage to said outflow passage through said gas flow hole.

* * * * *